(12) United States Patent
Kim et al.

(10) Patent No.: US 8,341,439 B2
(45) Date of Patent: Dec. 25, 2012

(54) POWER MANAGEMENT APPARATUS AND METHOD THEREOF AND POWER CONTROL SYSTEM

(75) Inventors: Sun Wook Kim, Daejeon (KR); Dae Won Kim, Daejeon (KR); Seong Woon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 449 days.

(21) Appl. No.: 12/768,511

(22) Filed: Apr. 27, 2010

(65) Prior Publication Data

US 2011/0138195 A1 Jun. 9, 2011

(30) Foreign Application Priority Data

Dec. 9, 2009 (KR) .................. 10-2009-0121611

(51) Int. Cl.
*G06F 1/18* (2006.01)
*G06F 1/32* (2006.01)
(52) U.S. Cl. ......... 713/300; 713/310; 713/320; 713/330
(58) Field of Classification Search .................. 713/300, 713/310, 320, 330
See application file for complete search history.

(56) References Cited

U.S. PATENT DOCUMENTS

| | | | | |
|---|---|---|---|---|
| 5,774,668 | A * | 6/1998 | Choquier et al. | 709/223 |
| 7,693,991 | B2 * | 4/2010 | Greenlee et al. | 709/226 |
| 2003/0023885 | A1 * | 1/2003 | Potter et al. | 713/300 |
| 2007/0250608 | A1 * | 10/2007 | Watt | 709/222 |
| 2009/0037162 | A1 | 2/2009 | Gaither et al. | |
| 2009/0049314 | A1 | 2/2009 | Taha et al. | |
| 2009/0055665 | A1 | 2/2009 | Maglione et al. | |
| 2009/0106571 | A1 * | 4/2009 | Low et al. | 713/310 |
| 2009/0150693 | A1 | 6/2009 | Kashyap et al. | |
| 2009/0158074 | A1 * | 6/2009 | Oh et al. | 713/340 |
| 2009/0187782 | A1 | 7/2009 | Greene et al. | |
| 2010/0058093 | A1 * | 3/2010 | Danieli et al. | 713/340 |
| 2010/0083010 | A1 * | 4/2010 | Kern et al. | 713/300 |
| 2010/0306566 | A1 * | 12/2010 | Dehaan et al. | 713/330 |
| 2011/0078467 | A1 * | 3/2011 | Hildebrand | 713/310 |

FOREIGN PATENT DOCUMENTS

JP 09-091254 4/1997

OTHER PUBLICATIONS

"CPU MISER: A Performance-Directed, Run-Time System for Power-Aware Clusters", Rong Ge et al., 2007 International Conference on Parallel Processing (ICPP 2007).
"System Level Adaptive Framework for Power and Performance Scaling on Intel® PXA27X Processor", Priya N. Vaidya et al., ICASSP 2005.

\* cited by examiner

*Primary Examiner* — Vincent Tran
(74) *Attorney, Agent, or Firm* — Blakely, Sokoloff, Taylor & Zafman (57) ABSTRACT

A power management apparatus includes: a service request monitor block for receiving service requests by service groups to provide load information of service platforms belonging to the respective service groups; a platform information collection block for collecting a configuration information of the service platforms and collecting load information of the service platforms in a predetermined cycle; a platform power state alteration block for altering power states of the service platforms by request; and a management interface block for providing a setup interface for a load-based and a time-based power control and providing platform profile information generated based on the load information.

19 Claims, 7 Drawing Sheets

POWER MANAGEMENT APPARATUS AND METHOD THEREOF AND POWER CONTROL SYSTEM

CROSS-REFERENCE(S) TO RELATED APPLICATION(S)

The present invention claims priority of Korean Patent Application No. 10-2009-0121611, filed on Dec. 9, 2009, which is incorporated herein by reference.

FIELD OF THE INVENTION

The present invention relates to a power control method in a cluster system, and more particularly, to a power management apparatus and method thereof and a power control system, which are capable of controlling power based on resource consumption of service platforms constituting a cluster system and a predetermined time.

BACKGROUND OF THE INVENTION

As well known in the art, recently, with expansion of IT infrastructures, power consumption in Internet data center (IDC) which operates hundreds of thousands of IT (information technology) equipments has been becoming a big issue.

Accordingly, many enterprises organized a consortium called "Green Grid Project" in April, 2005, and have researched on the power of the data center.

Especially, for construction of a low power data center called "Green Data Center", IBM (International Business Machines Corporation) is developing, for example, a server virtualization technology, a provisioning technology, a liquid cooling system and the like. Also, DVS (dynamic voltage scaling), which is a power management technology in a operating system level for implementation of a low power platform, a request hatching technology and a simultaneous multithreading technology are being developed.

As such, a variety of researches are being performed to reduce power consumption of service platforms in a data center. For example, 'ACPI 1.0' was established by Hewlett-Packard, Intel, Microsoft, Phoenix, Toshiba and others in 1996, which is a standard for managing power in overall hardware and software. According to ACPI 1.0, amount of power of hardware equipments is controlled by an operating system, so that the power consumption is reduced by supplying or blocking a power source of hardware equipments depending on whether the equipments are used or not. This ACPI was applied to windows operating system for the first time, and now, many operating systems such as Unix, Linux, and free-Berkeley Software Distribution are supporting ACPI.

Moreover, a standard, ACPI 3.0b, was established in October, 2006. In present, about 20 enterprises are using ACPI 3.0b as a standard and are participating in addition and correction of the standard.

Meanwhile, as a technology for reducing power consumption in a processor which consumes the largest power among internal components of a service platform, there is a dynamic voltage & frequency scaling (DVFS) technology. The DVFS technology reduces the power consumed in the processor by controlling an operation speed and voltage of the processor. Since the processor is synchronized with a clock, if the operation speed of the processor decreases, the power consumption of the processor is reduced. Also, power is proportionate to the square of the voltage, and thus if voltage of the processor decreases, the power consumption of the processor is reduced.

As described above, various technologies for reducing power consumption of service platform are developing. However, such technologies are for managing a power source of hardware resources within a single service platform. Therefore, it is difficult to support an efficient power management in a cluster system which is mainly used by many Internet portal services companies using a data center.

In case of performing a power control of a single service platforms using ACPI, service platforms constituting the cluster system often go down or go to sleep, so that it frequently occurs that services are not smoothly provided when there are many service requests. Moreover, a complexity of a monitoring system increases, thereby costs for management the system becomes high.

In the cluster system connecting respective service platforms each other, since all service platforms operate their function best all the time, power is consumed even when the cluster system does not have a work to do. Accordingly, a necessity of power management in the cluster system arises.

SUMMARY OF THE INVENTION

In view of the above, the present invention provides a power management apparatus and method thereof and a power control system, which are capable of reducing power consumption in entire system by controlling power based on resource consumption of service platforms constituting a cluster system and a predetermined time.

In accordance with a first aspect of the present invention, there is provided a power management apparatus, including:

a service request monitor block for receiving service requests by service groups to provide load information of service platforms belonging to the respective service groups;

a platform information collection block for collecting a configuration information of the service platforms and collecting load information service platforms in a predetermined cycle;

a platform power alteration block for altering power states of the service platforms by request; and a management interface block for providing a setup interface for a load-based and a time-based power control and providing platform profile information generated based on the load information.

In accordance with a second aspect of the present invention, there is provided a power management method, including:

classifying and operating service platforms by service groups based on configuration information of the service platforms when services are distributed to the service platforms by the service groups.

collecting load information of the respective service platforms belonging to the respective service groups;

altering power states of the respective service platforms based on the collected load information;

determining amount of service requests in a predetermined cycle;

controlling distribution of the services based on the amount of service requests and the load information; and altering the power states of the respective service platforms according to a predetermined time when a time-based power control is requested.

In accordance with a third aspect of the present invention, there is provided a power control system, including:

a service load distribution apparatus for distributing services according to service requests from a client via a service network and receiving service processing results to transmit the results to the client;

a service platform apparatus including a plurality of service platforms for performing the distributed services, transmitting load information and power state information of the respective service platforms in a predetermined cycle via a management network during the performance of the services, and when the performance of the services is completed, transmitting the service processing results to the service load distribution apparatus; and a power management apparatus for collecting the load information and power state information of the respective service platforms in the predetermined cycle, determining power states of the respective service platforms to perform a load-based and a time-based power control.

BRIEF DESCRIPTION OF THE DRAWINGS

The above features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
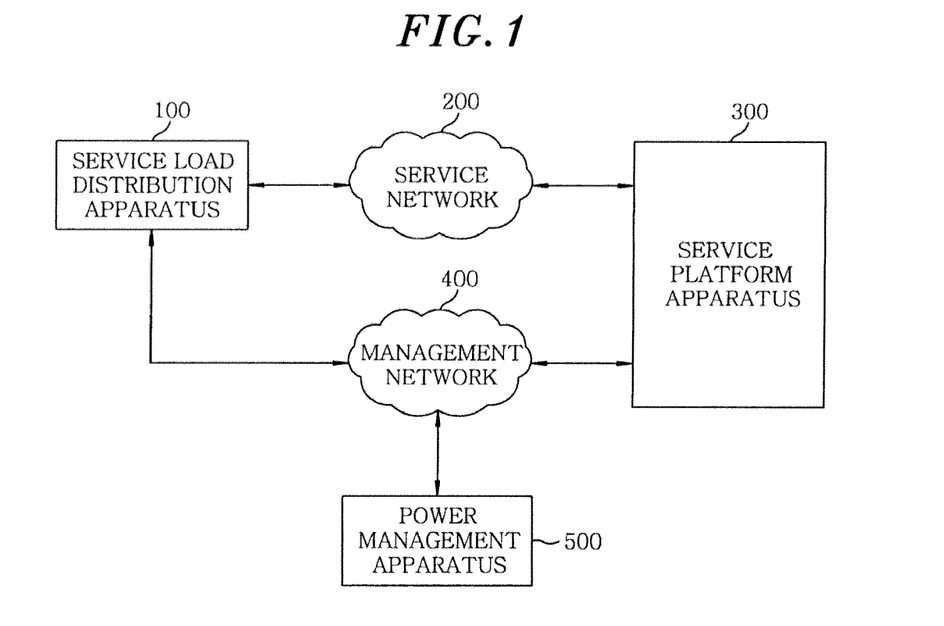
FIG. 1 is a block diagram showing a configuration of a power control system in accordance with an embodiment of the present invention.

FIG. 1 is a block diagram showing a configuration of a power control system which is suitable for controlling a power of respective service platforms based on time and load in accordance with an embodiment of the present invention. The power control system includes a service load distribution apparatus 100, service network 200, a service platform apparatus 300, a management network 400, and a power management apparatus 500.

Referring to FIG. 1, the service load distribution apparatus 100 distributes service requests from a client received through the Internet communication network to service platforms within the service platform apparatus 300 connected through the service network 200.

Further, the service load distribution apparatus 100 receives service processing results from the service platform apparatus 300 through the service network 200 and transmits the results to the client through the Internet communication network.

The service network 200 takes charge of data communication between the service load distribution apparatus 100 and the service platform apparatus 300.

The service platform apparatus 300 performs services per service group according to the service requests distributed by the service load distribution apparatus 100. Further, the service platform apparatus 300 transmits information on load and power state, in connection with a use of resources of the service platforms, to the power management apparatus 500 via the management network 400 in a predetermined cycle while performing the services. When the performance of the services is completed, the service platform apparatus 300 transmits the service processing results to the service load distribution apparatus 100 via the service network 200.

The management network 400 takes charge of data communication between the service platform apparatus 300 and the power management apparatus 500, and between the service load distribution apparatus 100 and the power management apparatus 500.

The power management apparatus 500 collects the information on load and power state related to the use of resources of the service platforms from the service platform apparatus 300 in the predetermined cycle and, based on this, determines power states of the service platforms. Further, the power management apparatus 500 performs a load-based and a time-based power control by controlling the service load distribution apparatus 100 and the service platform apparatus 300. The power management apparatus 500 may divide a plurality of service platforms within the service platform apparatus 300 by service groups to perform the power control per service group.

As described above, the power control system performs services per service group according to service requests from a client and determines power states of service platforms based on information on load and power in connection with a use of resources while the services are performed, thereby performing a load-based and a time-based power control.

Figure 2:
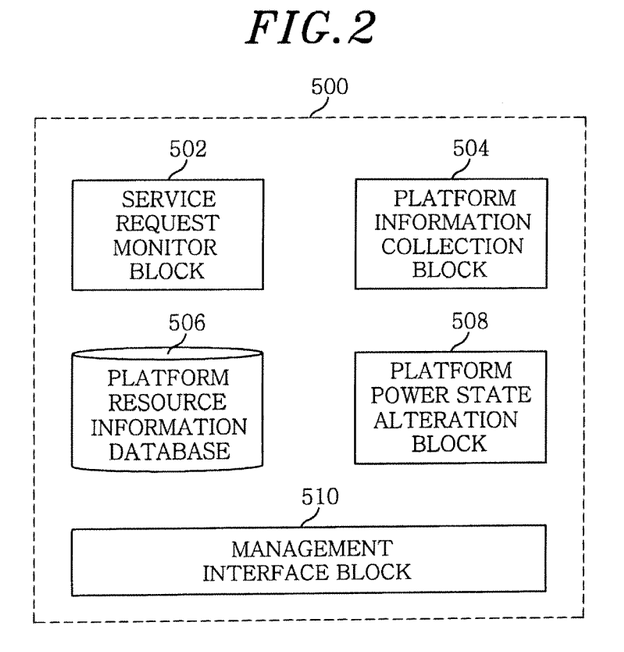
FIG. 2 illustrates a block diagram of a power management apparatus shown in FIG. 1.

FIG. 2 illustrates a block diagram of the power management apparatus 500 shown in FIG. 1.

The power management apparatus 500 includes a service request monitor block 502, a platform information collection block 504, a platform resource information database 506, a platform power state alteration block 508, and a management interface block 510.

Referring to FIG. 2, the service request monitor block 502 collects information on the amounts of service requests per service group from the service load distribution apparatus 100 and provides the information on the amounts of service requests per service group and load information of the service platforms belonging to the corresponding service groups.

The platform information collection block 504 collects configuration information of the service platforms after a cluster system having the service platform apparatus 300 is configured. Further, the platform information collection block 504 classifies a plurality of service platforms within service platform apparatus 300 by service groups based on the collected vice platform configuration information, and load information (e.g., resource consumption and power consumption) of the classified service platforms in the predetermined cycle.

The platform resource information database 506 stores the resource consumption and the power consumption in the service platform apparatus 300 collected by the platform information collection block 504. Here, the resource consumption and the power consumption may be accumulated to provide the load information per service group.

When a power state of any of the service platforms within the service platform apparatus 300 is in a sleep state or a sound sleep state, the platform power state alteration block 508 alters the power state of the corresponding service platform into a service-available state by need or by setup.

Here, the platform power state alteration block 508 alters the power state based on load and time. When a power state of any of the service platforms is altered into a sleep state or a sound sleep state due to a low usage rate of the corresponding service platform for a specific period of time to thereby minimize power consumption, if service requests to a service group where the corresponding service platform belongs increases, a service of the corresponding service platform may be required. In this case, a load-based power control is performed, so that the platform power state alteration block 508 may alter the power state into a power saving state. In addition, when any of the service platforms performs a power control according to a predetermined time, a time-based power control is performed, so that the platform power state alteration block 508 may alter a power state of the corresponding service platform from a sleep state into a sound sleep state, or from a sound sleep state into a power saving state at a required time for the alteration.

The management interface block 510 provides setup interface for a power control and provides time-based platform profile information generated based on the platform resource information database 506. A configuration of the management interface block 510 is shown in FIG. 3.

Figure 3:
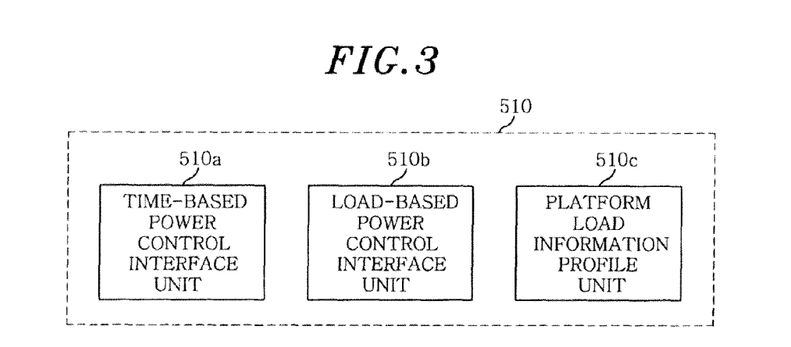
FIG. 3 illustrates a configuration of the management interface block is shown in FIG. 2.

Referring to FIG. 3, the management interface block 510 includes a time-based power control interface unit 510a, a load-based power control interface unit 510b, and a platform load information profile unit 510c. The time-based power control interface unit 510a provides interface for time setup for a time-based power control. The load-based power control interface unit 510b provides interface for a critical value setup for a load-based power control. The platform load information profile unit 510c provides load information by time (i.e., load amounts by time) and power consumption information by time in each service group or each service platform based on the resource consumption and power consumption collected in the predetermined cycle.

As described above, the power management apparatus 500 alters a power state based on time and load using a resource consumption and power consumption collected by the service platform apparatus 300, and performs a power control of respective service groups and respective service platforms based on time and load.

Figure 4A:
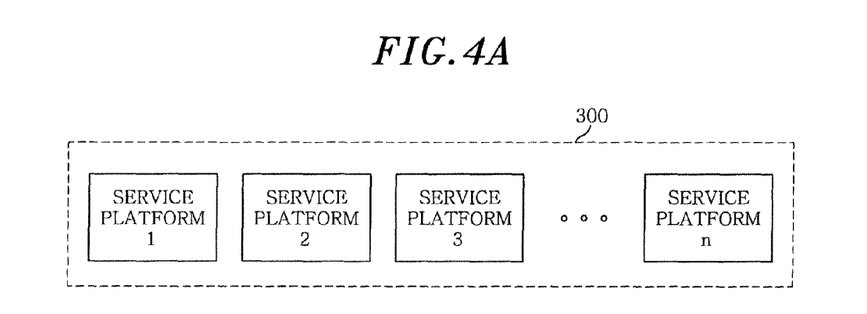
FIGS. 4A and 4B illustrate a configuration of a service platform apparatus shown in FIG. 1.
Figure 4B:
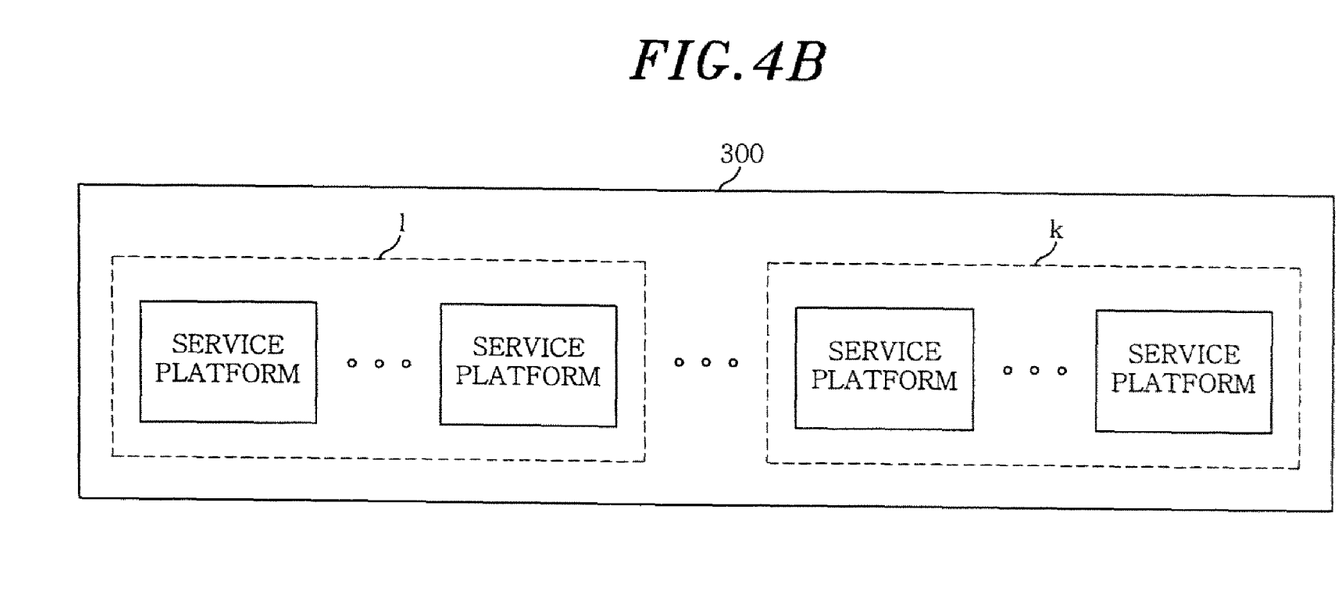

FIGS. 4A and 4B illustrate a configuration of the service platform apparatus 300 shown in FIG. 1.

As described in FIG. 4A, the service platform apparatus 300 includes a plurality of service platforms 1, 2, . . . , and n. The respective service platforms 1, 2, . . . , and n perform services distributed by the service load distribution apparatus 100. As illustrated in FIG. 4B, the service platform apparatus 300 classifies the service platforms 1, 2, . . . , and n shown in FIG. 4A by service groups 1, 2, . . . , and k. The service platforms classified by service groups 1, 2, . . . , and k performs respective services distributed to respective groups to transmit the service processing results to the service load distribution apparatus 100.

Figure 5:
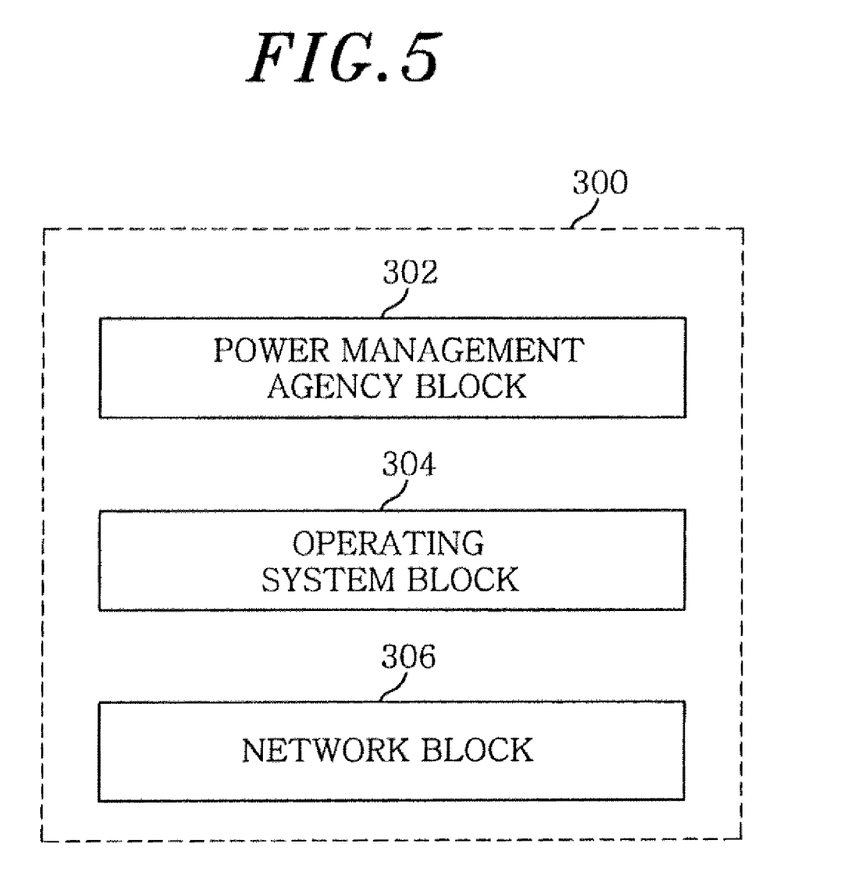
FIG. 5 illustrates a configuration of each service platform within the service platform apparatus shown in FIG. 4A.

FIG. 5 illustrates a configuration of each service platform within the service platform apparatus 300 shown in FIG. 4A. Each service platform includes a power management agency block 302, an operating system block 304, and a network block 306.

Referring to FIG. 5, the power management agency block 302 collects resource consumption information and power state information of the corresponding service platform in a predetermined cycle to transmit them to the power management apparatus 500 via the management network 400. Further, the power management agency block 302 determines a power state of the service platform based on the collected resource consumption information and power information to thereby alter the power state. The altered power state information is transmitted to the power management apparatus 500.

Here, if the service platform is a master service platform, the power state of the service platform is not altered to a sleep state or to a sound sleep state so that a delay of a service performed by the service platform can be prevented.

Figure 6:
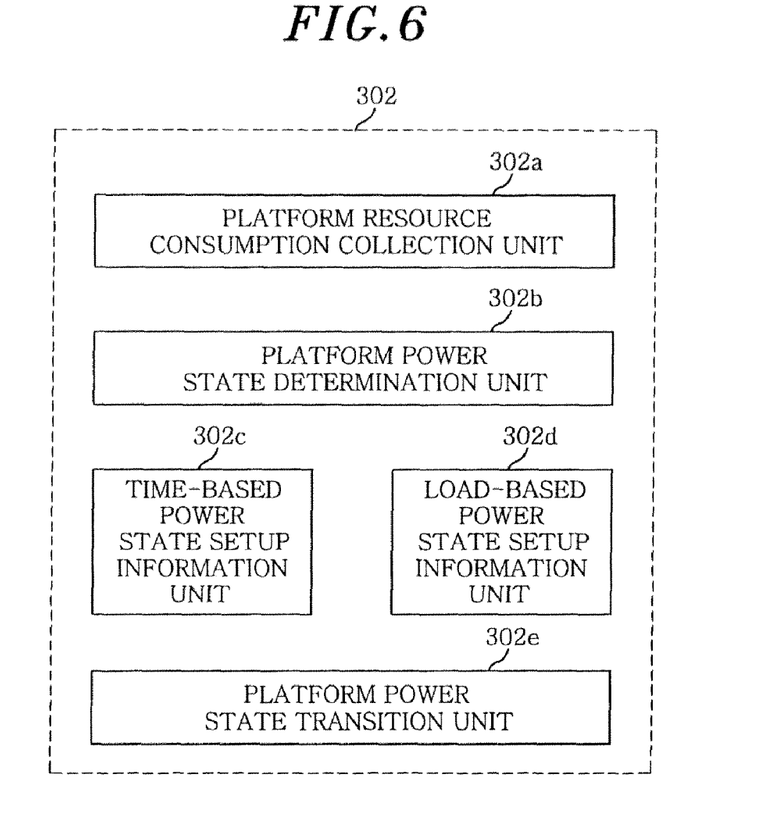
FIG. 6 illustrates a configuration of a power management agency block shown in FIG. 5.

A configuration of the power management agency block 302 is illustrated in FIG. 6. The power management agency block 302 includes a platform resource consumption collection unit 302a, a platform power state determination unit 302b, a time-based power state setup information unit 302c, a load-based power state setup information unit 302d, and a platform power state transition unit 302e. The platform resource consumption collection unit 302a collects the resource consumption information and the power information in the predetermined cycle to transmit them to the power management apparatus 500 by request.

The platform power state determination unit 302b determines the power state of the service platform by comparing the collected resource consumption information and the power information to a load-based power state setup information extracted from the load-based power state setup information unit 302d, or determines the power state at present time by comparing the collected resource consumption information and the power information to a time-based power state setup information extracted from the time-based power state setup information unit 302c.

The platform power state transition unit 302e alters the power state of the service platform based on the determined power state to transmit the altered power state information to the power management apparatus 500.

Referring to FIG. 5 again, the operating system block 304 includes any one of various operating systems such as Window, Unix, Linux, FreeBSD and the like. The operating system block 304 maintains the corresponding service platform so as to perform a variety of services.

The network block 306 includes, e.g., a network card for only service, a network card for only platform management, and the like. The network block 306 is connected to the service network 200 or to the management network 400, taking charge of data communication between apparatuses.

Figure 7:
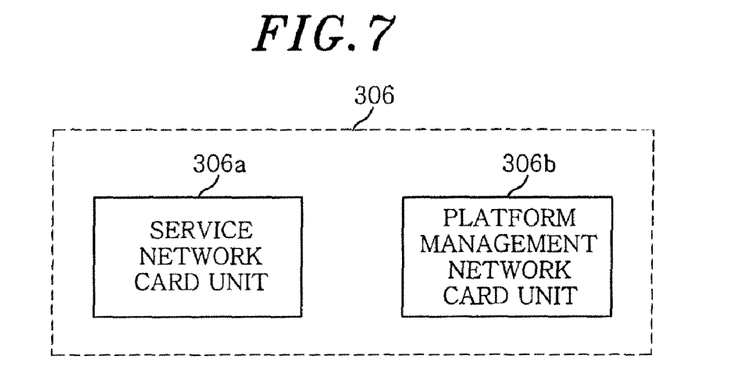
FIG. 7 illustrates a configuration of a network block shown in FIG. 5.

A configuration of the network block is shown in FIG. 7. Referring to FIG. 7, the network block 306 includes a service network card unit 306a and a platform management network card unit 306b. The service network card unit 306a uses a network card for only service to access the service network 200, thereby enabling data communication between the service load distribution apparatus 100 and the service platform apparatus 300. The platform management network card unit 306b uses a network card for only platform management to access the management network 400, thereby enabling data communication between the power management apparatus 500 and the service platform apparatus 300.

As described above, the respective service platforms within the service platform apparatus 300 can effectively process power control command from the power management apparatus 500 by determining a power state of the corresponding service platform based on collected resource consumption and power state information, altering the power state by need, and providing the determination result and alteration result to the power management apparatus 500.

Figure 8:
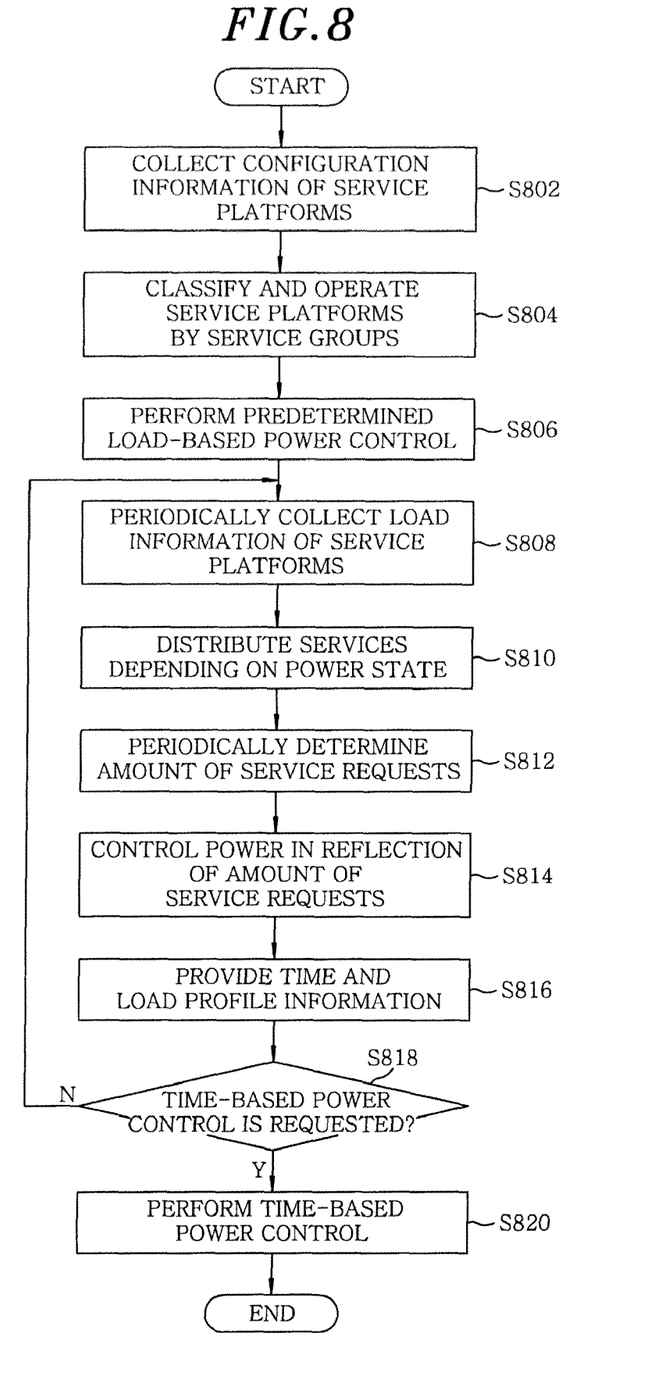
FIG. 8 is a flowchart illustrating a time-based and a load-based power control process for the respective service platforms.

FIG. 8 is a flowchart illustrating a time-based and a load-based power control process for the respective service platforms.

Referring to FIG. 8, if a cluster system including a service platform apparatus 300 is configured, the power management apparatus 500 collects configuration information (e.g., resource consumption, power state information, etc.) of respective service platforms within the service platform apparatus 300 in step S802.

Next, the power management apparatus 500 classifies the service platforms by service groups based on the collected configuration information and operates the service platforms of each service group in step S804.

Thereafter, the power management apparatus 500 performs a predetermined load-based power control (which controls power according to load information set in the beginning) in step S806.

In step S808, the power management apparatus 500 collects the load information of the respective service platforms in a predetermined cycle to perform a load-based power control. For example, when a power state of any of the service platforms is altered into a sleep state or a sound sleep state due to a low usage rate of the corresponding service platform for a specific period of time to thereby minimize power consumption, if service requests to a service group to which the corresponding service platform belongs increases, a service of the corresponding service platform may be required. In this case, the power management apparatus 500 may alter the power state into a power saving state.

Figure 9:
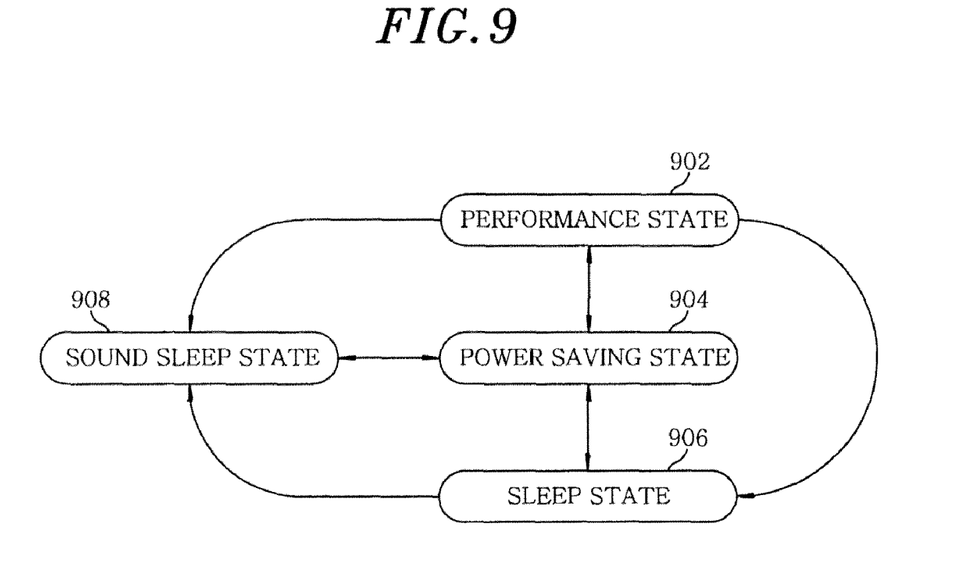
FIG. 9 shows power states of respective service platforms.

As an example, FIG. 9 shows power states of respective service platforms. In a performance state 902, the corresponding service platform operates with the maximum performance by a large amount of service requests. In a power saving state 904, the service platform operates with about 50% of the maximum performance since the service requests are required to some extent but the load of the service platform is kept relatively small. When the load of the service platform is kept below about 1% of the maximum performance for a predetermined period of time, a power state of the service platform is altered into a sleep state 906. When the power state of the service platform stays in the sleep state 906 for a predetermined period of time, the power state of the service platform is altered into a sound sleep state 908.

Next, the power management apparatus 500 controls the service load distribution apparatus 100 to distribute services only to service platforms in the performance state or in the power saving state based on the power state information and load information transmitted from the service platform apparatus 300 in step S810.

Subsequently, the power management apparatus 500 determines the amount of the service requests by a user in a predetermined cycle in step S812. Further, the power management apparatus 500 controls the service load distribution apparatus 100 to distribute services depending on the load information of the service platform in reflection of the determined amount of the service requests in step S814. For example, the service requests or load of the service platform increases, services platforms in the sleep or sound sleep state among other service platforms included in the service group to which the service platform belongs are altered into a service-available state. This is reported to the service load distribution apparatus 100 so that the distribution of services can be divided.

Thereafter, the power management apparatus 500 provides time and load profile information (e.g., the amount of service requests by time, a load amount by platform) including the collected service requests and load amount.

The power management apparatus 500 checks whether the time-based power control is requested from a manager based on the time and load profile information in step S818.

If the time-based power control is requested in step S818, the power management apparatus 500 performs the time-based power control by a predetermined time in step S820. For example, when any of the service platforms performs a power control according to a predetermined time, the power management apparatus 500 may alter a power state of the corresponding service platform from a sleep state into a sound sleep state, or from a sound sleep state into a power saving state at a required time for the alteration.

Meanwhile, if the time-based power control is not requested in step S818, the power management apparatus 500 continuously performs the process of step S808 to S816.

Therefore, the power management apparatus 500 may effectively perform a power control of respective service groups or respective service platforms by altering a power state of each service platform based on time and load using resource consumption and power consumption collected from the service platform apparatus 300.

The present invention classifies service platforms by service groups and controls power of service platforms based on service requests and service load amounts, thereby minimizing power consumption of the service platforms without delay in providing services.

While the invention has been shown and described with respect to the embodiments, it will be understood by those skilled in the art that various changes and modification may be made without departing from the scope of the invention as defined in the following claims.

What is claimed is:

1. A power management apparatus, comprising:
a service request monitor block for receiving service requests by service groups to provide load information of service platforms belonging to the respective service groups;
a platform information collection block for collecting a configuration information of the service platforms and collecting load information of the service platforms in a predetermined cycle;
a platform power state alteration block for altering power states of the service platforms by request; and
a management interface block for providing a setup interface for a load-based and a time-based power control and providing platform profile information generated based on the load information.

2. The power management apparatus of claim 1, wherein the platform information collection block classifies the service platforms by the service groups based on the service platform configuration information to collect the load information of the classified service platforms in the predetermined cycle.

3. The power management apparatus of claim 2, wherein the load information includes resource consumption and power consumption.

4. The power management apparatus of claim 2, wherein the platform power state alteration block alters the power states of the service platforms into a service-available state according to the load information or the predetermined time.

5. The power management apparatus of claim 4, wherein the power state is any one of a performance state, a power saving state, a sleep state, and a sound sleep state.

6. The power management apparatus of claim 2, wherein the management interface block includes:
- a time-based power control interface unit for providing interface for time-setup for the time-based power control;
- a load-based power control interface unit for providing interface for a critical value setup for the load-based power control; and
- a platform load information profile unit for providing load information by time and power consumption information by time in the respective service groups or the respective service platforms based on the load information collected in the predetermined cycle.

7. A power management method, comprising:
- classifying and operating service platforms by service groups based on configuration information of the service platforms when services are distributed to the service platforms by the service groups;
- collecting load information of the respective service platforms belonging to the respective service groups;
- altering power states of the respective service platforms based on the collected load information;
- determining amount of service requests in a predetermined cycle;
- controlling distribution of the services based on the amount of service requests and the load information; and
- altering the power states of the respective service platforms according to a predetermined time when a time-based power control is requested.

8. The power management method of claim 7, wherein the power state is any one of a performance state, a power saving state, a sleep state, and a sound sleep state.

9. The power management method of claim 8, wherein said altering the power states according to the predetermined time includes checking that the time-based power control is requested after time and load profile information is provided.

10. The power management method of claim 9, wherein the time and load profile information includes amount of service requests by time and platform load information by time.

11. The power management method of claim 8, wherein the services are distributed to service platforms in the performance state or in the power saving state.

12. The power management method of claim 11, wherein the load information includes resource consumption and power consumption.

13. A power control system, comprising:
- a service load distribution apparatus for distributing services according to service requests from a client via a service network and receiving service processing results to transmit the results to the client;
- a service platform apparatus including a plurality of service platforms for performing the distributed services, transmitting load information and power state information of the respective service platforms in a predetermined cycle via a management network during the performance of the services, and when the performance of the services is completed, transmitting the service processing results to the service load distribution apparatus; and
- a power management apparatus for collecting the load information and power state information of the respective service platforms in the predetermined cycle, determining power states of the respective service platforms to perform a load-based and a time-based power control.

14. The power control system of claim 13, wherein the power management apparatus classifies the plurality of service platforms by service groups based on configuration information of the service platforms, and collects the load information of the classified service platforms in the predetermined cycle.

15. The power control system of claim 14, wherein the power management apparatus alters the power states of the respective service platforms into a service-available state according to the load information or a predetermined time.

16. The power control system of claim 15, wherein the power state is any one of a performance state, a power saving state, a sleep state, and a sound sleep state.

17. The power control system of claim 16, wherein the power management apparatus controls distribution of services from the service load distribution apparatus based on amount of the service requests received from the service load distribution apparatus and the load information of the respective service platforms.

18. The power control system of claim 17, wherein the power management apparatus controls the service load distribution apparatus to distribute the services to service platforms in the performance state or in the power saving state.

19. The power control system of claim 18, wherein the load information includes resource consumption and power consumption.

* * * * *